United States Patent
Takai

(10) Patent No.: US 9,992,424 B2
(45) Date of Patent: Jun. 5, 2018

(54) IMAGING APPARATUS, CAMERA SYSTEM, AND CONTROL METHOD CONTROLLING FLASH PHOTOGRAPHY

(71) Applicant: CANON KABUSHIKI KAISHA, Tokyo (JP)

(72) Inventor: Junji Takai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 14/306,055

(22) Filed: Jun. 16, 2014

(65) Prior Publication Data

US 2014/0368729 A1    Dec. 18, 2014

(30) Foreign Application Priority Data

Jun. 17, 2013    (JP) ................................. 2013-127003

(51) Int. Cl.
| | |
|---|---|
| *H04N 5/235* | (2006.01) |
| *H04N 5/232* | (2006.01) |
| *H04N 5/225* | (2006.01) |
| *G03B 7/17* | (2014.01) |
| *G03B 15/05* | (2006.01) |

(52) U.S. Cl.
CPC ............. *H04N 5/2354* (2013.01); *G03B 7/17* (2015.01); *G03B 15/05* (2013.01); *H04N 5/2256* (2013.01); *H04N 5/232* (2013.01); *H04N 5/23245* (2013.01); *G03B 2215/0521* (2013.01); *G03B 2215/0528* (2013.01)

(58) Field of Classification Search
CPC ............. H04N 5/2354; H04N 5/23245; H04N 5/2256; H04N 5/232; G03B 7/17; G03B 15/05; G03B 2215/0521; G03B 2215/0528
See application file for complete search history.

(56) References Cited

U.S. PATENT DOCUMENTS

| | | | | |
|---|---|---|---|---|
| 4,384,238 A | * | 5/1983 | Greenwald et al. | 315/151 |
| 4,464,039 A | * | 8/1984 | Ishida | 396/157 |
| 5,040,007 A | * | 8/1991 | Hagiuda | 396/155 |
| 5,136,312 A | * | 8/1992 | Weaver et al. | 396/61 |
| 5,194,885 A | * | 3/1993 | Spencer | 396/61 |
| 5,287,134 A | * | 2/1994 | Cocca | 396/203 |

(Continued)

FOREIGN PATENT DOCUMENTS

| | | |
|---|---|---|
| CN | 101902575 A | 12/2010 |
| JP | 63-204238 A | 8/1988 |

(Continued)

*Primary Examiner* — Dennis Hogue
(74) *Attorney, Agent, or Firm* — Canon U.S.A., Inc. IP Division

(57) ABSTRACT

An imaging apparatus includes an operation unit and a control unit to perform photographing using an illumination apparatus capable of automatically driving a movable unit, including a light emitting unit, for changing an irradiation direction of the light emitting unit. The operation unit receives an instruction to start a photographing operation. The control unit performs control, in a case where the operation unit receives an instruction to start a photographing operation while the movable unit is being automatically driven to change the irradiation direction of the light emitting unit, not to perform flash photography in which the light emitting unit is caused to emit light.

3 Claims, 8 Drawing Sheets

(56) References Cited

U.S. PATENT DOCUMENTS

| | | | | |
|---|---|---|---|---|
| 5,361,120 A | * | 11/1994 | Takami | G03B 7/16 |
| | | | | 396/165 |
| 5,416,543 A | * | 5/1995 | Stephenson | 396/207 |
| 2009/0196595 A1 | * | 8/2009 | Okubo | 396/175 |
| 2009/0208198 A1 | * | 8/2009 | Khuntia | 396/174 |
| 2010/0284676 A1 | * | 11/2010 | Shintani et al. | 396/175 |
| 2013/0314565 A1 | * | 11/2013 | Spielberg | 348/224.1 |
| 2014/0240950 A1 | * | 8/2014 | Ueda et al. | 362/3 |
| 2015/0036042 A1 | * | 2/2015 | Umehara et al. | 348/371 |
| 2015/0037021 A1 | * | 2/2015 | Umehara | 396/174 |
| 2015/0092104 A1 | * | 4/2015 | Umehara | 348/371 |
| 2015/0109754 A1 | * | 4/2015 | Takenaka et al. | 362/4 |

FOREIGN PATENT DOCUMENTS

| | | |
|---|---|---|
| JP | 04-340527 A | 11/1992 |
| JP | H08-240843 A | 9/1996 |
| JP | 2011-137960 A | 7/2011 |

\* cited by examiner

IMAGING APPARATUS, CAMERA SYSTEM, AND CONTROL METHOD CONTROLLING FLASH PHOTOGRAPHY

BACKGROUND OF THE INVENTION

Field of the Invention

The present invention relates to an imaging apparatus, and in particular, to controlling flash photography.

Description of the Related Art

Conventionally, there has been a technique of flash photography (hereinafter referred to as bounce flash photography) in which an illumination apparatus projects light on a ceiling to irradiate an object with diffuse-reflected light from the ceiling. In such bounce flash photography, the illumination apparatus is capable of indirectly irradiating the object with light instead of directly irradiating the object. As a result, an image can be captured with soft lighting.

Further, there has been a technique for automatically determining an optimum irradiation direction when performing bounce flash photography. For example, Japanese Patent Application Laid-Open No. 04-340527 discusses a technique for automatically setting, when performing bounce flash photography, an angle of a flash light emitting unit at which the flash light is emitted towards the ceiling. More specifically, the angle is automatically set based on a distance to a subject above a camera and a distance to an object to be photographed.

However, the technique discussed in Japanese Patent Application Laid-Open No. 04-340527 does not consider the case where a release switch S2 is turned on (i.e., fully pressed) to start a photography operation while the flash light emitting unit is being driven based on calculated angle data. As a result, if the release switch S2 is turned on while the flash light emitting unit is being driven, bounce flash photography is performed at an inappropriate angle. The image is thus unsuccessfully captured as if only a portion of the object is irradiated with the flash light.

SUMMARY OF THE INVENTION

The present invention is directed to preventing, when automatically determining the irradiation direction of the illumination apparatus and performing bounce flash photography, the image from being unsuccessfully captured as if only a portion of the object is irradiated with the flashed light.

According to an aspect of the present invention, an imaging apparatus to perform photographing using an illumination apparatus capable of automatically driving a movable unit, including a light emitting unit, for changing an irradiation direction of the light emitting unit, the imaging apparatus includes an operation unit configured to receive an instruction to start a photographing operation, and a control unit configured to perform control, in a case where the operation unit receives an instruction to start a photographing operation while the movable unit is being automatically driven to change the irradiation direction of the light emitting unit, not to perform flash photography in which the light emitting unit is caused to emit light.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
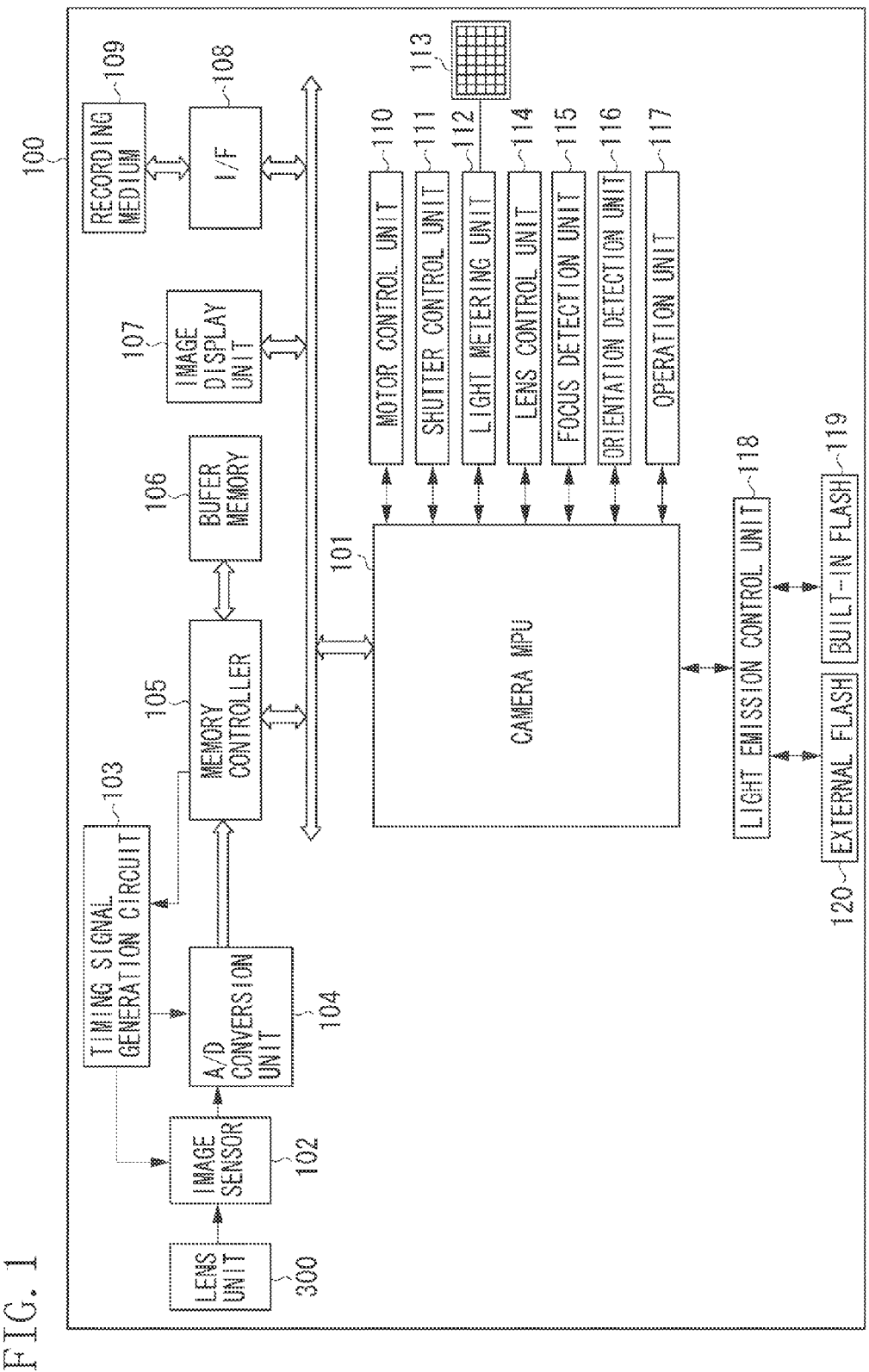
FIG. 1 is a block diagram illustrating a configuration example of an imaging apparatus according to a first exemplary embodiment of the present invention.

A camera 100 which is an imaging apparatus according to the first exemplary embodiment will be described below with reference to FIG. 1. FIG. 1 is a block diagram illustrating a configuration example of the camera 100.

Referring to FIG. 1, a camera micro-processing unit (MPU) 101 is a microcontroller for controlling the operations of the camera 100. An image sensor 102, e.g., a charge coupling device (CCD) or a complementary metal-oxide semiconductor (CMOS), converts reflected light from the object to an electric signal. A timing signal generation circuit 103 generates a timing signal which is necessary for the imaging sensor 102 to operate. An analog/digital (A/D) conversion unit 104 converts analog image data read from the image sensor 102 to digital image data. A memory controller 105 controls reading and writing on a memory or re-freshing a buffer memory 106. An image display unit 107 displays the image data stored in the buffer memory 106. An interface 108 is an interface for connecting to a recording medium 109, e.g., a memory card or a hard disk. A motor control unit 110 controls a motor (not illustrated) according to the signal received from the camera MPU 101. The motor control unit 110 thus vertically moves a mirror (not illustrated) for changing an optical path of a light flux entering the camera 100 via a lens unit 300. If the motor control unit 110 moves the mirror upwards, the light flux entering the camera 100 via the lens unit 300 is guided to the image sensor 102. If the motor control unit 110 moves the mirror downwards, the light flux entering the camera 100 via the lens unit 300 is guided to a light metering sensor 113.

A shutter control unit 111 controls, based on a signal received from the camera MPU 101, a shutter (not illustrated) which is arranged in front of the image sensor 102 for switching the image sensor 102 between a shielded state and an exposed state.

In the light metering sensor 113, an image frame is divided into a plurality of areas to measure the amount of light in each area. A light metering unit 112 then outputs a light metering value, i.e., a light metering result of each of the plurality of areas, to the camera MPU 101, based on the measurements by the light metering sensor 113. The camera MPU 101 uses the light metering value of each area and performs exposure calculation for determining an aperture value (AV), i.e., an exposure control value when performing imaging, a shutter speed (TV), and a imaging sensitivity (ISO).

Further, the camera MPU 101 calculates an amount of light emission of a built-in flash 119 or an external flash 120 when performing flash photography. The camera MPU 101 calculates based on the light metering value output from the light metering unit 112 when the built-in flash 119 or the external flash 120 performs pre-flash emission on the object.

A lens control unit 114 controls a lens driving motor (not illustrated) and a diaphragm driving motor (not illustrated) according to the signal received from the camera MPU 101. The lens control unit 114 thus performs focus adjustment and diaphragm adjustment of the lens unit 300.

A focus detection unit 115 outputs a defocus amount of each focusing point based on the output from a focus detection sensor which includes a plurality of focusing points within the image frame. The camera MPU 101 instructs and causes the lens control unit 114 to perform focus adjustment based on the defocus amount output from the focus detection unit 115.

An orientation detection unit 116 which includes an acceleration sensor detects the orientation of the camera 100 with respect to the direction of gravity.

An operation unit 117 includes a release button which receives an instruction to start photographing preparation or the photographing operation. If a user performs a first stroke on (i.e., half-presses) a release button so that SW1 is turned on, the camera MPU 101 starts the photographing preparation such as a focus detection operation or a light metering operation. If the user performs a second stroke on (i.e., fully presses) the release button so that the SW2 is turned on, the camera MPU 101 starts the photographing operation.

Further, the operation unit 117 includes an auto bounce switch for switching between executing a function for automatically determining the optimum irradiation direction when performing bounce flash photography (hereinafter referred to as auto bounce), and not executing such a function.

A light emission control unit 118 controls, when the built-in flash 119 is to be used, a flash pattern such as the pre-flash or a main flash and an amount of light emission according to the signal from the camera MPU 101.

Further, the light emission control unit 118 performs switching control for switching between control of the built-in flash 119 and control of the external flash 120 according to the signal received from the camera MPU 101.

Figure 3:
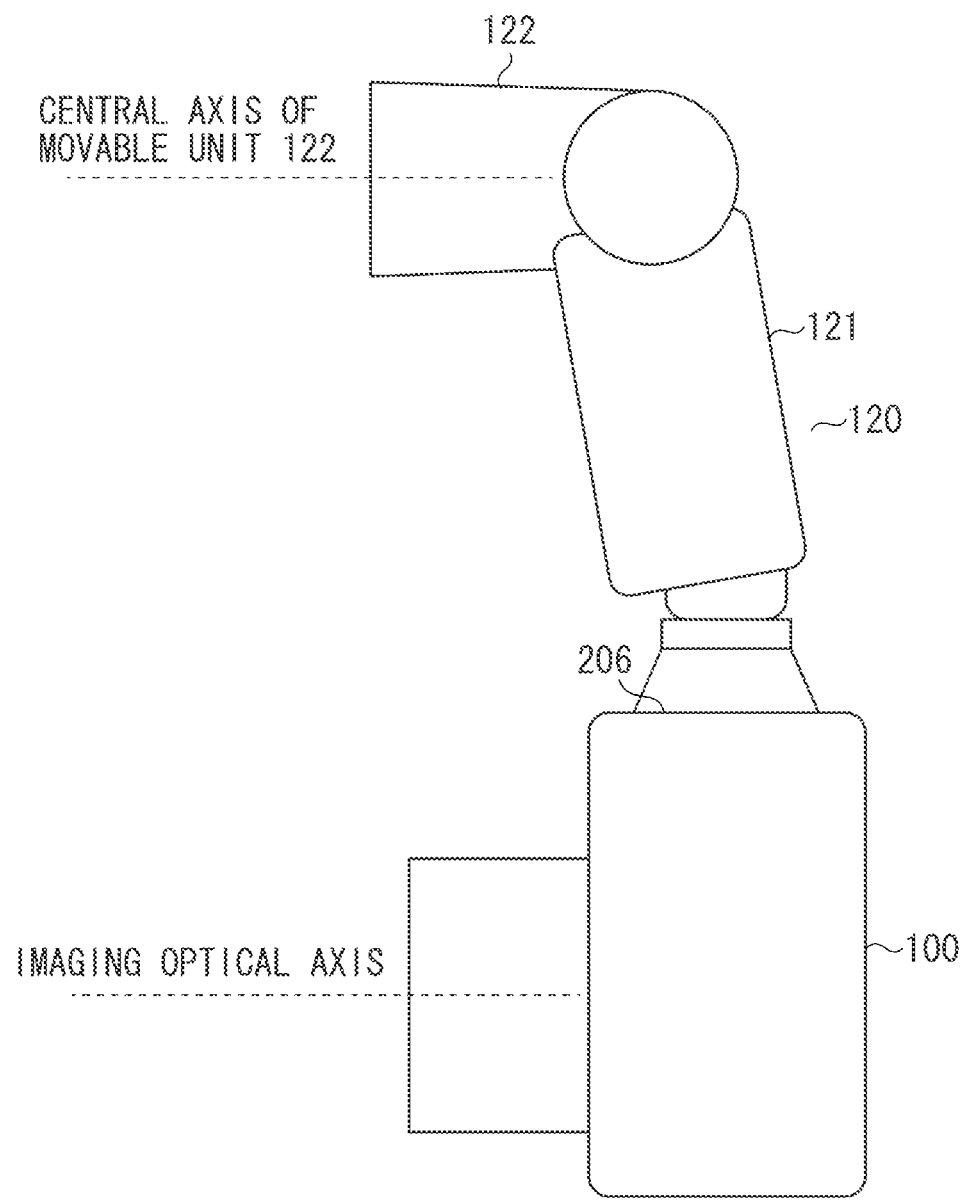
FIG. 3 illustrates a state in which the illumination apparatus is attached to the imaging apparatus according to the first exemplary embodiment.

According to the present exemplary embodiment, a case will be described below, in which the external flash 120 is controlled according to a signal from the camera MPU 101 in a camera system including the camera 100 and the external flash 120 as illustrated in FIG. 3.

The configuration of the external flash 120, i.e., the illumination apparatus, will be described below with reference to FIG. 2 which is a block diagram illustrating the configuration example of the external flash 120.

Figure 2:
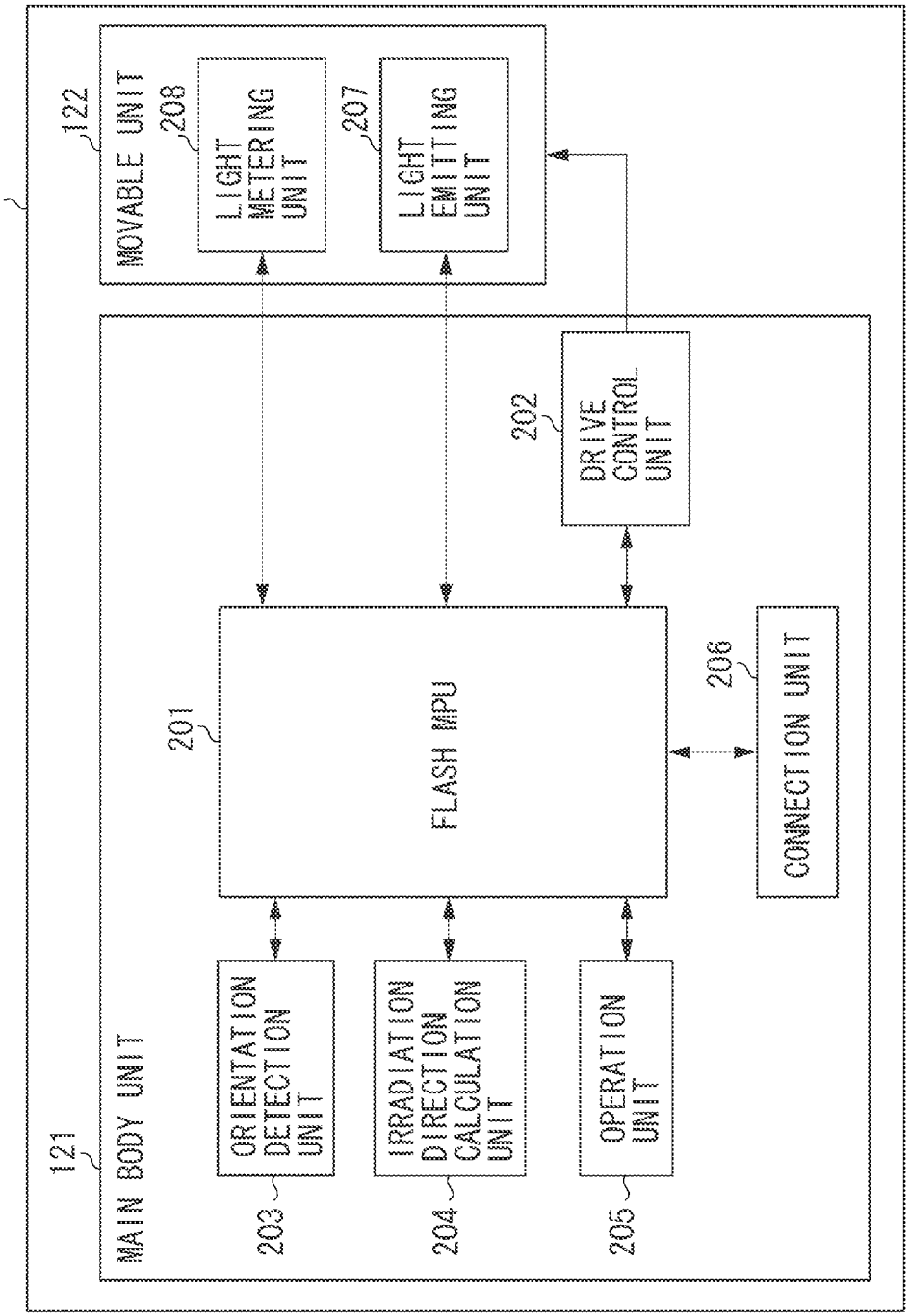
FIG. 2 is a block diagram illustrating a configuration example of an illumination apparatus according to the first exemplary embodiment.

Referring to FIG. 2, the external flash 120 includes a main body unit 121 to be attached to the camera 100 and a movable unit 122 supported to be rotatable in the vertical and horizontal directions with respect to the main body unit 121. A mechanism for supporting the movable unit 122 to be rotatable in the vertical and horizontal directions with respect to the main body unit 121 may be a known mechanism, such as the mechanism discussed in Japanese Patent Application Laid-Open No. S63-204238 and Japanese Patent Application Laid-Open No. 2011-137960. Detailed description will thus be omitted.

The main body unit 121 includes a flash MPU 201, a drive control unit 202, an orientation detection unit 203, an irradiation direction calculation unit 204, an operation unit 205, and a connection unit 206. The movable unit 122 includes a light emitting unit 207 and a light metering unit 208.

The flash MPU 201 is a microcontroller for controlling the operations of the external flash 120. The drive control unit 202 controls the motor (not illustrated) according to the signal received from the flash MPU 201, and drives the movable unit 122 in the vertical and horizontal directions with respect to the main body unit 121. Further, the drive control unit 202 uses an encoder and obtains a drive amount of the movable unit 122 with respect to the main body unit 121 from a reference position, and outputs the obtained drive amount to the flash MPU 201. The reference position of the movable unit 122 with respect to the main body unit 121 may be the position as illustrated in FIG. 3 in which a central axis of the movable unit 122 and a photographing optical path of the imaging apparatus do not intersect when the illumination apparatus is attached to the imaging apparatus.

The orientation detection unit 203 which includes the acceleration sensor detects the orientation of the main body unit 121. The irradiation direction calculation unit 204 calculates the optimum irradiation direction for performing bounce flash photography, based on information obtained by the orientation detection unit 203 and information obtained by the light metering unit 208 to be described below. The process for calculating the irradiation direction will be described in detail below.

The operation unit 205 includes the auto bounce switch for switching between performing or not performing auto bounce. If the auto bounce switch in the operation unit 117 of the camera 100 and the auto bounce switch in the operation unit 205 of the external flash 120 are differently set, one of the settings may be prioritized. Further, the setting of the auto bounce switch in the operation unit 117 of the camera 100 may be linked with the setting of the auto bounce switch in the operation unit 205 of the external flash 120. In other words, the settings may be specified so that if the setting of one of the auto bounce switches is changed, the setting of the other auto bounce switch is automatically changed.

The connection unit 206 includes an attachment portion for attaching the external flash 120 to the imaging apparatus and a contact portion in which a communication contact point with the imaging apparatus is disposed. The flash MPU 201 communicates with the imaging apparatus via the contact portion in the connection unit 206.

The light emitting unit 207 uses a flash tube or a light-emitting diode (LED) as a light source, and includes an optical system formed of resin arranged in front of the light source. The light emitting unit 207 causes the light source to emit light according to a light emission signal output from the flash MPU 201. The light metering unit 208 is configured such that a light receiving surface of a light receiving sensor is arranged to face the same direction as the irradiation direction of the light emitting unit 207. The light metering unit 208 thus outputs the signal according to the light flux received by the light receiving sensor to the flash MPU 201. The flash MPU 201 then calculates the distance from an irradiation surface of the optical system in the light emitting unit 207 to an irradiation target. More specifically, the flash MPU 201 calculates the distance based on the signal output from the light metering unit 208 receiving a light flux reflected from the irradiation target when the light emitting unit 207 has emitted light. The orientation and the position of the light receiving sensor are not limited to the above example. The reflected light flux from the irradiation target may be received via a light guide member such as an optical fiber in which an incident surface is arranged to face the same direction as the irradiation direction of the light emitting unit 207.

Figure 4:
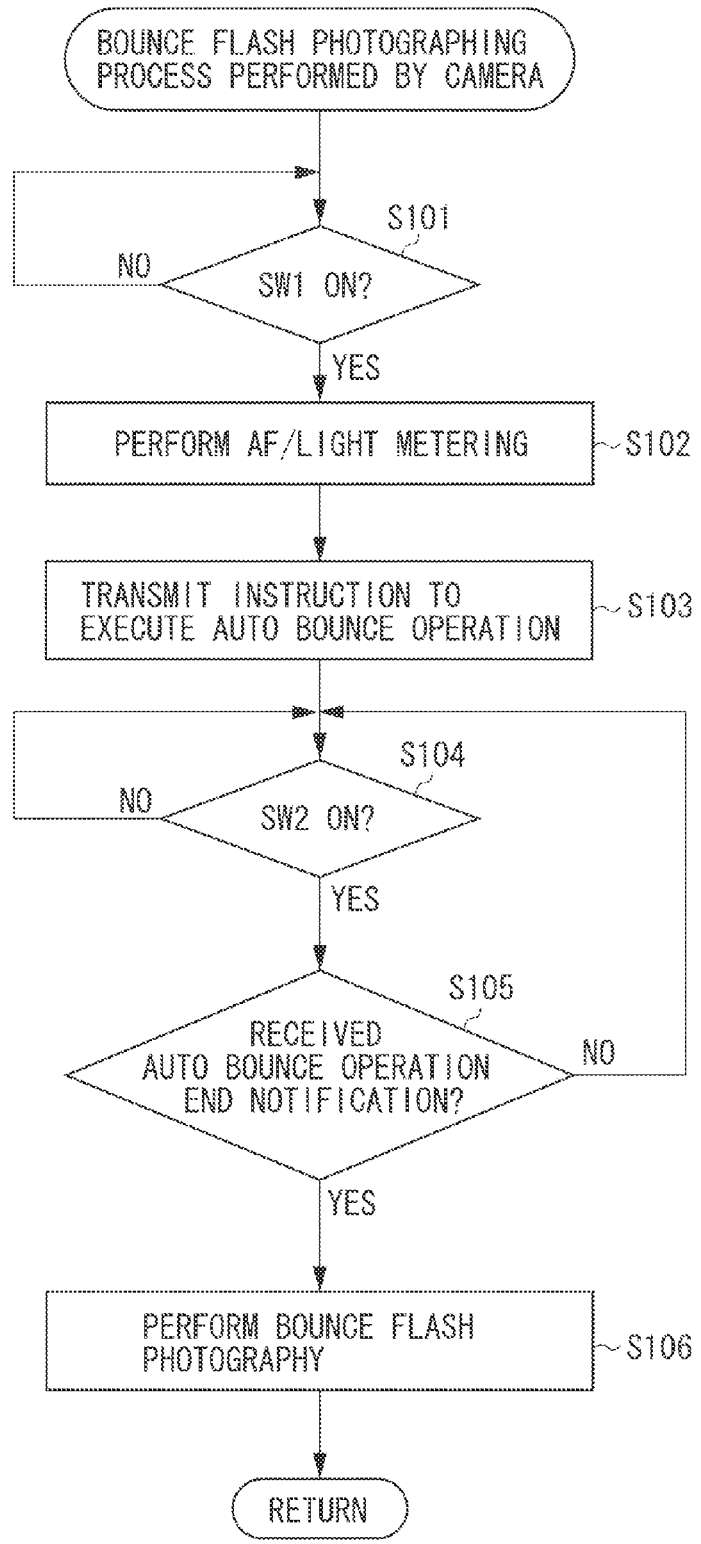
FIG. 4 is a flowchart illustrating various processes executed by the imaging apparatus when performing bounce flash photography according to the first exemplary embodiment.
Figure 5:
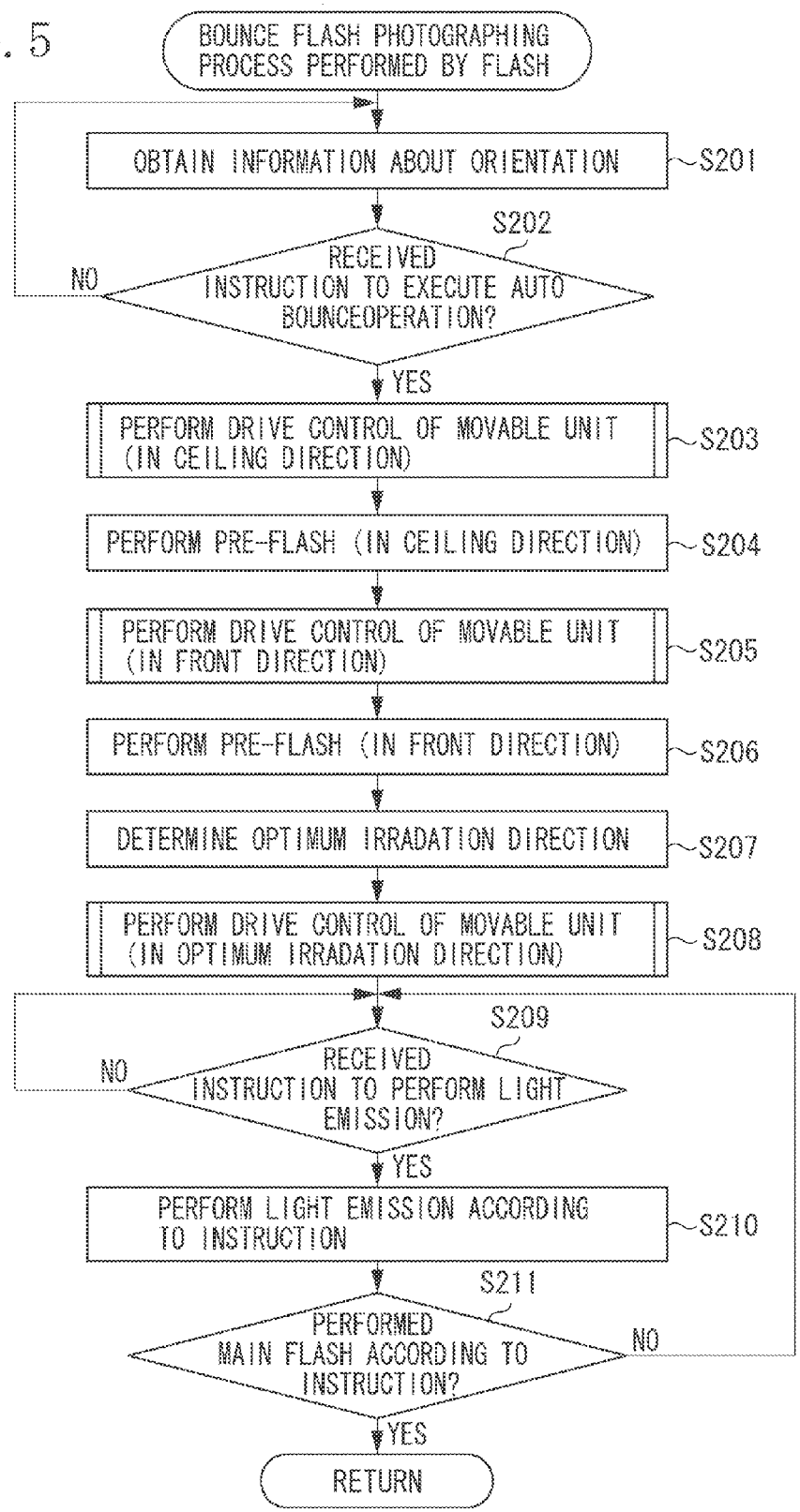
FIG. 5 is a flowchart illustrating various processes executed by the illumination apparatus when performing bounce flash photography according to the first exemplary embodiment.
Figure 6:
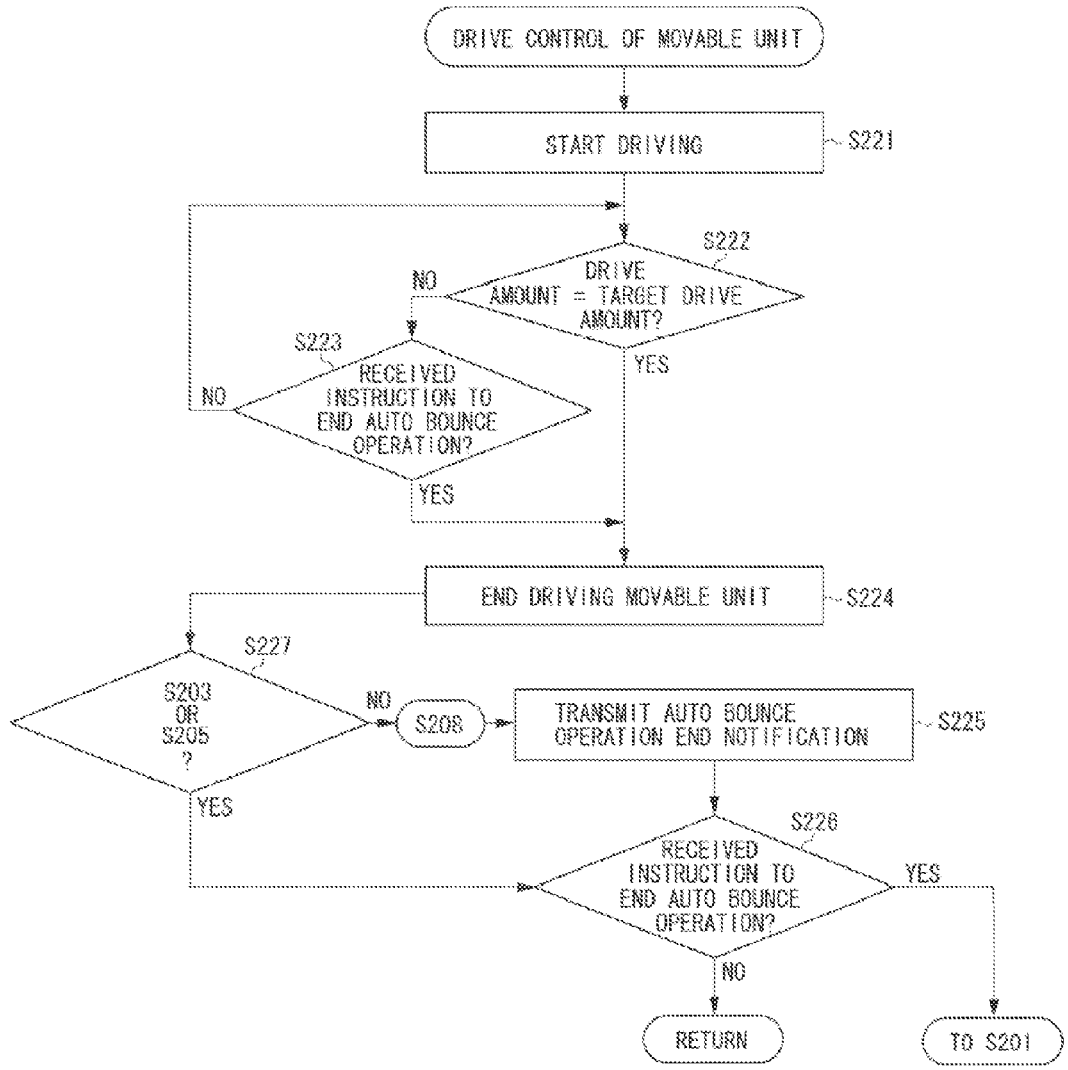
FIG. 6 is a flowchart illustrating a process executed along with driving a movable unit 122 in the illumination apparatus when performing bounce flash photography according to the first exemplary embodiment.

The various processes executed in the case where bounce flash photography is to be performed using the above-described camera 100 and external flash 120 will be described below with reference to FIGS. 4, 5, and 6. FIG. 4 is a flowchart illustrating the various processes executed by the camera 100 when bounce flash photography is to be performed. FIG. 5 is a flowchart illustrating the various processes executed by the external flash 120 when bounce flash photography is to be performed. FIG. 6 is a flowchart illustrating the various processes executed along with driving the movable unit 122 in the external flash 120 when bounce flash photography is to be performed.

The various processes executed by the camera 100 will be described below with reference to FIG. 4. When both the camera 100 and the external flash 120 have been switched on and are set using the auto bounce switches to execute auto bounce, the process illustrated in the flowchart of FIG. 4 is started.

In step S101, the camera MPU 101 determines whether the SW1 has been turned on by the user operating on the operation unit 117. If the SW1 has been turned on (YES in step S101), the process proceeds to step S102. If the SW1 is off (NO in step S101), the process of step S101 is repeated.

In step S102, the camera MPU 101 instructs and causes the lens control unit 114 to perform focus adjustment (AF) and instructs and causes the light metering unit 112 to perform light metering. Further, the camera MPU 101 performs exposure calculation based on the light metering value obtained by performing light metering, and determines an exposure control value to be used in photographing.

In step S103, the camera MPU 101 instructs and causes the light emission control unit 118 to transmit an instruction to perform an auto bounce operation to the external flash 120. Upon receiving the instruction to perform the auto bounce operation, the external flash 120 drives the movable unit 122 for changing the irradiation direction to the optimum direction for performing bounce flash photography as will be described below.

In step S104, the camera MPU 101 determines whether the SW2 has been turned on by the user operating on the operation unit 117. If the SW2 has been turned on (YES in step S104), the process proceeds to step S105. If the SW2 is off (NO in step S104), the process of step S104 is repeated.

In step S105, the camera MPU 101 determines whether an auto bounce operation end notification has been received from the external flash 120. The flash MPU 201 transmits the auto bounce operation end notification in step S225 illustrated in FIG. 6, i.e., the flowchart illustrating the various processes executed by the external flash 120 to be described below. If the camera MPU 101 has received the auto bounce operation end notification from the external flash 120 (YES in step S105), the process proceeds to step S106. If the camera MPU 101 has not received the notification (NO in step S105), the process returns to step S104.

In step S106, the camera MPU 101 performs bounce flash photography. More specifically, the camera MPU 101 instructs the light emission control unit 118 to perform pre-flash of a predetermined amount of light, and causes the light emission control unit 118 to transmit the instruction to perform pre-flash to the external flash 120. The camera MPU 101 then instructs and causes the light metering unit 112 to perform light metering of the pre-flash emission when the external flash 120 performs pre-flash according to the pre-flash execution instruction. The camera MPU 101 calculates an amount of main flash emission based on the obtained light metering value (i.e., the light metering value of the pre-flash). The camera MPU 101 then instructs the light emission control unit 118 to perform main flash according to the calculated amount of main flash emission and transmit the instruction to perform main flash to the external flash 120. The camera MPU 101 then exposes the image sensor 102 using the exposure control value determined in step S102 in accordance with the external flash 120 performing the main flash in response to the main flash execution instruction. The camera MPU 101 thus performs bounce flash photography.

As described above, if the instruction to start the photographing operation is received from the user after the instruction to perform the auto bounce operation is transmitted to the external flash 120 and before the auto bounce operation end notification is received from the external flash 120, the camera 100 does not perform the photographing operation. In other words, if the user instruction to start the photographing operation is received after starting the operation for determining the irradiation direction of the light emitting unit 207 and before ending the driving operation of the movable unit 122 for directing the light emitting unit 207 in the irradiation direction, the camera 100 does not perform flash photography. As a result, the camera 100 is prevented from performing bounce flash photography in which the external flash 120 is caused to emit light in an inappropriate direction.

The various processes executed by the external flash 120 will be described below with reference to FIGS. 5 and 6. When both the camera 100 and the external flash 120 have been switched on and are set using the auto bounce switches to perform auto bounce, the process of the flowchart illustrated in FIG. 5 is started.

In step S201, the flash MPU 201 obtains the information on the orientation of the main body unit 121 from the orientation detection unit 203. The information on the orientation of the main body unit 121 includes a tilt angle of the main body unit 121 in front and back directions and the horizontal direction. The tilt angle is the angle based on the orientation in which the connection unit 206 is directed in the direction of gravity (i.e., a normal position).

In step S202, the flash MPU 201 determines whether an instruction to execute the auto bounce operation has been received from the camera 100. The light emission control unit 118 transmits the execution instruction in step S103 of FIG. 4 illustrating the various processes executed by the camera 100. If the execution instruction has been received from the camera 100 (YES in step S202), the process proceeds to step S203. If the execution instruction has not been received (NO in step S202), the process returns to step S201.

In step S203 to step S208 to be described below, the external flash 120 determines the optimum irradiation direction for performing bounce flash photography. Further, the external flash 120 performs the auto bounce operation for driving the movable unit 122 to be directed in the determined irradiation direction.

In step S203, the flash MPU 201 instructs and causes the drive control unit 202 to drive the movable unit 122 so that the irradiation direction becomes the opposite direction of the direction of gravity (i.e., becomes the ceiling direction). In such a case, the flash MPU 201 calculates a drive amount of the movable unit 122 necessary for causing the irradiation direction to be the ceiling direction based on the information on the orientation of the main body unit 121 and the drive amount from the current reference position of the movable unit 122.

In step S204, after driving the movable unit 122 so that the irradiation direction becomes the ceiling direction, the flash MPU 201 instructs the light emitting unit 207 to perform pre-flash. The flash MPU 201 then instructs and causes the light metering unit 208 to perform light metering of the pre-flash emission. The flash MPU 201 thus calculates the distance from the irradiation surface of the light emitting unit 207 to the ceiling based on the obtained light metering value (i.e., the light metering value of the pre-flash emission). The distance from the irradiation surface of the light emitting unit 207 to the ceiling may be calculated as follows. A pre-flash light metering value in the case where the irradiation target of a predetermined reflectance is positioned at a predetermined distance is assumed. The actual distance to the irradiation target is then calculated from a difference between the assumed pre-flash light metering value and the actual pre-flash light metering value. In such a case, the light flux received by the light metering unit 208 is the light flux reflected by the irradiation target which the light emitting unit 207 has irradiated. The optical path length of the light flux received by the light metering unit 208 thus does not match twice the distance from the irradiation surface of the light emitting unit 207 to the ceiling. However, the difference between the positions of the light receiving sensor in the light metering unit 208 and the irradiation surface of the light emitting unit 207 has little influence on determining the irradiation direction for performing bounce flash photography. As a result, according to the present exemplary embodiment, the positions of the light receiving sensor in the light metering unit 208 and the irradiation surface of the light emitting unit 207 are calculated to be the same.

In step S205, the flash MPU 201 instructs and causes the drive control unit 202 to drive the movable unit 122 so that the irradiation direction becomes a photographing direction (i.e., the front direction). According to the present exemplary embodiment, if the orientation of the main body unit 121 is the normal position and the movable unit 122 is in the reference position, the irradiation direction becomes the photographing direction. The flash MPU 201 thus calculates the drive amount of the movable unit 122 which is necessary for the irradiation direction to become the front direction. The flash MPU 201 calculates based on the information on the orientation of the main body unit 121 and the drive amount of the movable unit 122 from the reference position to the front position.

In step S206, after driving the movable unit 122 so that the irradiation direction becomes the photographing direction, the flash MPU 201 instructs the light emitting unit 207 to perform pre-flash, similarly to step S204. The flash MPU 201 then instructs and causes the light metering unit 208 to perform light metering of the pre-flash emission. Further, the flash MPU 201 calculates the distance from the irradiation surface of the light emitting unit 207 to the object based on the obtained light metering value (i.e., the pre-flash light metering value).

In step S207, the flash MPU 201 instructs and causes the irradiation direction calculation unit 204 to determine the optimum irradiation direction for performing bounce flash photography. The irradiation direction calculation unit 204 then determines the optimum irradiation direction for performing bounce flash photography based on the information about the orientation of the main body unit 121, the distance from the irradiation surface of the light emitting unit 207 to the ceiling, and the distance from the irradiation surface of the light emitting unit 207 to the object. The irradiation direction can be determined using the following equation (1). In equation (1), d is the distance from the irradiation surface of the light emitting unit 207 to the ceiling, D is the distance from the irradiation surface of the light emitting unit 207 to the object, and θ is the angle of the movable unit 122 with respect to the main body unit 121 which becomes the optimum irradiation direction.

$$\theta = \tan^{-1}(2d/D) \quad (1)$$

The angle obtained using the above-described equation (1) is the angle when the orientation of the external flash 120 is the normal position. The angle which has been corrected according to the tilt angle of the orientation of the main body unit 121 is thus determined as the angle of the movable unit 122 that is the optimum irradiation direction for performing bounce flash photography.

In step S208, the flash MPU 201 instructs and causes the drive control unit 202 to drive the movable unit 122 so that the irradiation direction becomes the direction determined in step S207.

In step S209, the flash MPU 201 determines whether an instruction to perform light emission has been received from the camera 100. The light emission control unit 118 transmits the light emission instruction in step S106 of FIG. 4 illustrating the various processes executed by the camera 100. If the flash MPU 201 has received the light emission instruction from the camera 100 (YES in step S209), the process proceeds to step S210. If the instruction has not been received (NO in step S209), the process of step S209 is repeated.

In step S210, the flash MPU 201 instructs and causes the light emitting unit 207 to perform pre-flash or main flash, according to the light emission pattern and the amount of light emission instructed from the camera 100.

In step S211, the flash MPU 201 determines whether the light emission pattern instructed from the camera 100 corresponds to the main flash emission. If the flash MPU 201 determines that the light emission pattern instructed from the camera 100 corresponds to the pre-flash emission (NO in step S211), the process returns to step S209 for performing main flash in continuation. On the other hand, if the flash MPU 201 determines that the light emission pattern instructed from the camera 100 corresponds to the main flash emission (YES in step S211), the processes for performing the bounce flash photography ends.

As described above, the external flash 120 drives the movable unit 122 and determines the optimum irradiation direction for performing bounce flash photography according to the instruction to execute the auto bounce operation received from the camera 100. The external flash 120 thus drives the movable unit 122 to become the determined irradiation direction. In such a case, the movable unit 122 automatically takes various angles while being driven to be in the determined irradiation direction. As a result, if the light emitting unit 207 is caused to emit light while the movable unit 122 is being driven, it is highly likely that the irradiation direction becomes inappropriate. To solve such a problem, if the user instruction to start the photographing operation is received while the movable unit 122 is being driven to perform the auto bounce operation, bounce flash photography is not performed. It thus prevents bounce flash photography to be performed by the external flash 120 emitting light in the inappropriate direction.

The method for determining whether the movable unit 122 in the external flash 120 is being driven will be described below with reference to FIG. 6. FIG. 6 is a flowchart of the process executed along with driving of the movable unit 122 in the external flash 120 when performing bounce flash photography. Each of the steps in the flowchart illustrated in FIG. 6 is performed in step S203, step S205, and step S208 of the flowchart illustrated in FIG. 5.

In step S221, the drive control unit 202 controls the motor (not illustrated) according to the instruction from the flash MPU 201 and starts driving the movable unit 122.

In step S222, the drive control unit 202 compares the drive amount of the movable unit 122 from the reference position with the drive amount of the movable unit 122 from the reference position for directing the movable unit 122 to the target irradiation direction (i.e., a target drive amount). The drive amount of the movable unit 122 from the reference position is obtained using the encoder. If the obtained drive amount matches the target drive amount (YES in step S222), the process proceeds to step S224. If the obtained drive amount does not match the target drive amount (NO in step S222), the process proceeds to step S223.

In step S223, the flash MPU 201 determines whether the instruction to end the auto bounce operation has been received from the camera 100. If the flash MPU 201 has received the instruction to end the auto bounce operation (YES in step S223), the process proceeds to step S224. If the flash MPU 201 has not received the instruction to end the auto bounce operation (NO in step S223), the process returns to step S222. The camera 100 transmits the instruction to end the auto bounce operation to the external flash 120 when the user has switched off the camera 100 or has changed the setting of the camera 100 to not performing auto bounce while the external flash 120 is performing the auto bounce operation.

In step S224, the drive control unit 202 controls the motor and ends driving the movable unit 120.

In step S225, the flash MPU 201 transmits an auto bounce operation end notification to the camera 100 via the connection unit 206. As indicated by step S227, the flash MPU 201 performs the process of step S225 only when performing step S208, and does not perform the process of step S225 when performing step S203 and step S205.

In step S226, the flash MPU 201 determines whether the instruction to end the auto bounce operation has been received from the camera 100. If the instruction to end the auto bounce operation has been received (YES in step S226), the process proceeds to step S201 illustrated in FIG. 5. If the instruction to end the auto bounce operation has not been received (NO in step S226), the process proceeds to the subsequent step (i.e., one of step S204, step S206, and step S209).

As described above, upon completion of driving the movable unit 122 in the irradiation direction which has been determined by performing the auto bounce operation, the external flash 120 transmits the auto bounce operation end notification to the camera 100. The camera 100 thus determines that the external flash 120 is performing the auto bounce operation and does not perform bounce flash photography until the auto bounce operation end notification has been received. As a result, it prevents bounce flash photography to be performed by the external flash 120 emitting light in an inappropriate direction.

In the above-described example, bounce flash photography is not performed without responding to the instruction to start the photographing operation. However, the camera 100 may stand by to perform bounce flash photography while the movable unit 122 is being automatically driven. In other words, if the instruction to start the photographing operation is received while performing the auto bounce operation, the camera 100 stands by to perform bounce flash photography until the external flash 120 has ended the auto bounce operation. The camera 100 thus performs bounce flash photography after the external flash 120 has ended the auto bounce operation. If the camera 100 stands by to perform bounce flash photography as described above, it is not necessary for the user to reinstruct starting the photographing operation. The user can thus instruct starting the photographing operation without considering whether the auto bounce operation has ended.

The various processes executed when the imaging apparatus performs bounce flash photography according to the second exemplary embodiment of the present invention will be described below with reference to FIG. 7. According to the present exemplary embodiment, if the user instruction to start the photographing operation is received after transmitting the instruction to perform the auto bounce operation to the external flash 120 and before receiving the auto bounce operation end notification from the external flash 120, the imaging apparatus performs non-flash photography. Such a process is different from the first exemplary embodiment. According to the present exemplary embodiment, the user is prevented from missing an opportunity to capture an image even when the imaging apparatus is not capable of performing optimum bounce flash photography.

According to the present exemplary embodiment, configurations of the imaging apparatus and the illumination apparatus are similar to the configurations of the camera 100 and the external flash 120 according to the first exemplary embodiment. Detailed description thereof will thus be omitted. Further, since the various processes executed by the external flash 120 when performing the bounce flash photography are similar to those described with reference to FIGS. 5 and 6, description will be omitted. Furthermore, the steps illustrated in FIG. 7 in which similar processes as those illustrated in FIG. 4 according to the first exemplary embodiment are performed will be assigned the same reference numbers, and detailed description will be omitted.

Figure 7:
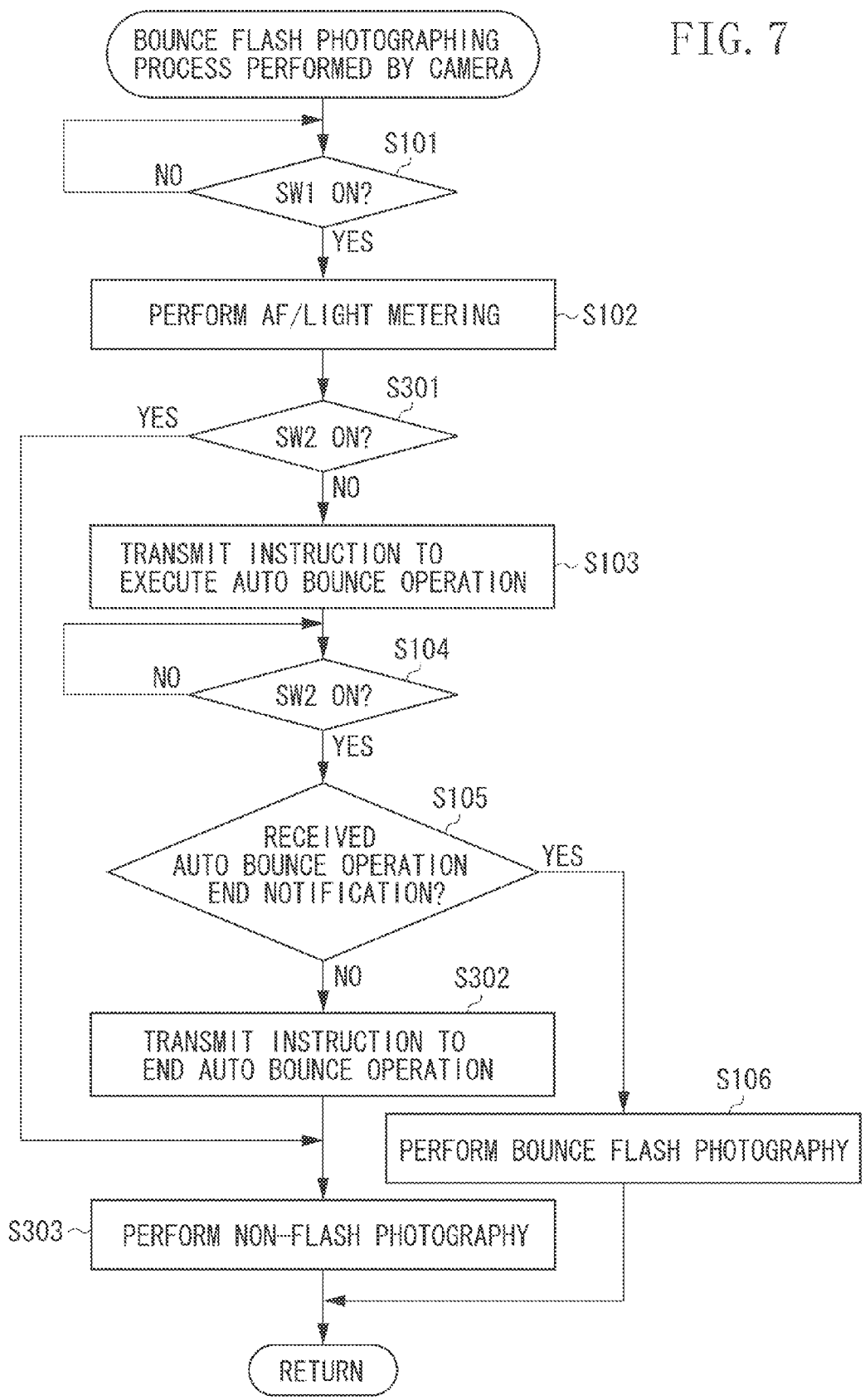
FIG. 7 is a flowchart illustrating various processes executed by an imaging apparatus when performing bounce flash photography according to a second exemplary embodiment of the present invention.

Referring to FIG. 7, after the process of step S102 illustrated in FIG. 4 has been performed, the process proceeds to step S301. In step S301, the camera MPU 101 determines whether the SW2 has been turned on by the user operating on the operation unit 117. If the SW2 has been turned on (YES in step S301), the process proceeds to step S303. In step S303, the camera MPU 101 performs photographing without causing the external flash 120 to emit light (i.e., performs non-flash photography). In other words, since the user desires to immediately perform photographing, the user turns on the SW2 after turning on the SW1 and before the auto bounce operation has been started. The camera MPU 101 thus performs the process of step S303 to respond to such a desire of the user. If the process proceeds from step S301 to step S303 as described above, the auto bounce operation is not executed so that bounce flash photography cannot be appropriately performed. Photographing is thus performed without flashing the external flash 120. The exposure control value when performing such non-flash photography is determined in step S102.

If the SW2 is off (NO in step S301), the process proceeds to step S103. In step S103, the camera MPU 101 causes the auto bounce operation to be started.

If the user has then turned on the SW2 after the auto bounce operation has been started (YES in step S104), the process proceeds to step S105. In step S105, the camera MPU 101 determines whether the auto bounce operation end notification has been received from the external flash 120. If the camera MPU 101 has received the auto bounce operation end notification (YES in step S105), the process proceeds to step S106. In step S106, the camera MPU 101 performs bounce flash photography. If the camera MPU 101 has not received the notification (NO in step S105), the process proceeds to step S302.

In step S302, the camera MPU 101 instructs and causes the light emission control unit 118 to transmit the instruction to end the auto bounce operation to the external flash 120. In other words, the camera MPU 101 suspends the auto bounce operation. Such a process is performed to prioritize photographing to be performed at the timing desired by the user in order not to miss the photo opportunity over photographing in a state in which the optimum bounce flash photography can be performed. If the movable unit 122 may be driven during non-flash photography, it is not necessary for the camera MPU 101 to cause the light emission control unit 118 to transmit the instruction to end the auto bounce operation.

The process then proceeds to step 303, and the camera MPU 101 performs non-flash photography.

As described above, according to the present exemplary embodiment, if the user instruction to start the photographing operation is received after transmitting the auto bounce operation execution instruction to the external flash 120 and before receiving the auto bounce operation end notification from the external flash 120, the camera 100 performs non-flash photography. As a result, it prevents unsuccessfully capturing an image, for example, it prevents only a portion of the object from being irradiated with the flashed light. Further, the user can photograph without missing a photo opportunity.

Figure 8:
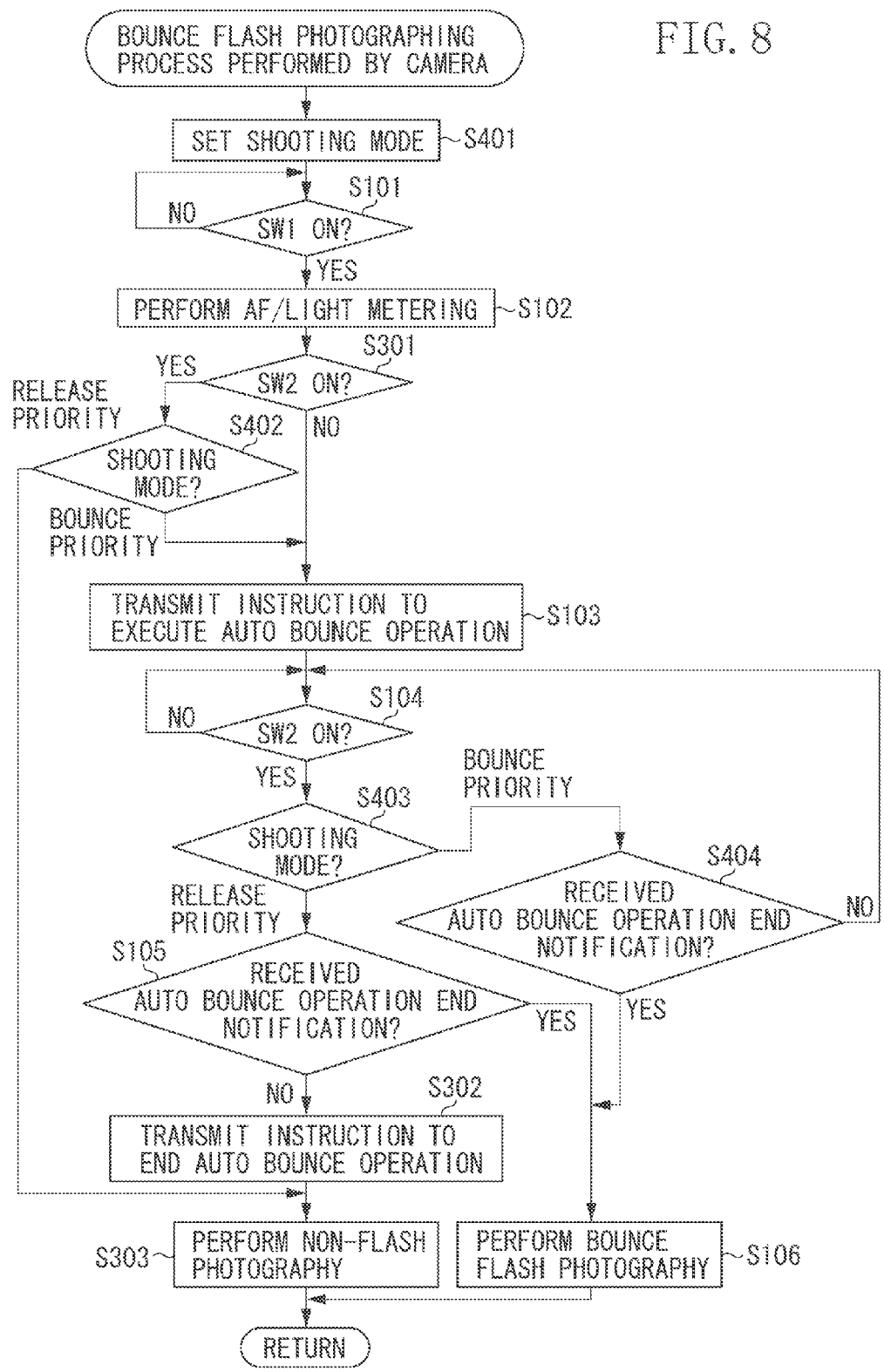
FIG. 8 is a flowchart illustrating various processes executed by an imaging apparatus when performing bounce flash photography according to a third exemplary embodiment of the present invention.

The various processes executed when the imaging apparatus performs bounce flash photography according to the third exemplary embodiment of the present invention will be described below with reference to FIG. 8. The present exemplary embodiment is different from the first and second exemplary embodiments in that, if the user has instructed to start photographing while the auto bounce operation is being executed, the imaging apparatus switches between not performing photographing and performing non-flash photographing according to a shooting mode. According to the present exemplary embodiment, the user can select whether to prioritize photographing in a state in which the optimum bounce flash photography can be performed or prioritize not missing the photo opportunity. As a result, the imaging apparatus can perform photographing according to the user intention while preventing unsuccessful photographing of an image, for example, it prevents only a portion of the object from being irradiated with the flashed light, as compared to the first and second exemplary embodiments.

The configurations of the imaging apparatus and the illumination apparatus according to the present exemplary embodiment are similar to the configurations of the camera 100 and the external flash 120 according to the first exemplary embodiment. Detailed description thereof will thus be omitted. However, the shooting mode is set based on the user operation on a shooting mode setting button in the operation unit 117 as will be described below. Further, since the various processes executed by the external flash 120 when performing the bounce flash photography are similar to those described with reference to FIGS. 5 and 6, description will be omitted. Furthermore, the steps illustrated in FIG. 8, in which similar processes as those illustrated in FIG. 4 according to the first exemplary embodiment and in FIG. 7 according to the second exemplary embodiment are performed, will be assigned the same reference numbers. Detailed description thereof will also be omitted.

In step S401, the camera MPU 101 sets the shooting mode based on the user operating on the operation unit 117. The shooting mode can be set to either a bounce priority mode or a release priority mode. The bounce priority mode prioritizes performing photographing in a state in which the optimum bounce flash photography can be performed. The release priority mode prioritizes performing photographing at the timing desired by the user to not to miss the photo opportunity.

Upon performing the process of step S102, the process proceeds to step S301. In step S301, the camera MPU 101 determines whether the SW2 has been turned on by the user operating on the operation unit 117. If SW2 has been turned on (YES in step S301), the process proceeds to step S402. In step S402, the camera MPU 101 determines a set shooting mode. If the release priority mode is set (RELEASE PRIORITY in step S402), the process proceeds to step S303. In step S303, the camera MPU 101 performs non-flash photography. On the other hand, if the bounce priority mode is set (BOUNCE PRIORITY in step S402), the process proceeds to step S103. As described above, the camera MPU 101 switches the process performed in the case where the SW2 is turned on after the SW1 has been turned on and before the auto bounce operation has been started, based on the set shooting mode. The camera 100 can thus perform photographing according to the user intention.

If the user has turned on the SW2 after the auto bounce operation has been started (YES in step S104), the process proceed to step S403. In step S403, the camera MPU 101 determines the set shooting mode. If the release priority mode is set (RELEASE PRIORITY in step S43), the process proceeds to step S105. If the bounce priority mode is set (BOUNCE PRIORITY in step S403), the process proceeds to step S404.

In step S105, the camera MPU 101 determines whether the auto bounce operation end notification has been received from the external flash 120. If the camera MPU 101 has received the auto bounce operation end notification (YES in step S105), the process proceeds to step S106. In step S106, the camera MPU 101 performs bounce flash photography. If the camera MPU 101 has not received the notification (NO in step S105), the process proceeds to step S302.

On the other hand, in step S404, the camera MPU 101 determines whether the auto bounce operation end notification has been received from the external flash 120. If the camera MPU 101 has received the auto bounce operation end notification (YES in step S404), the process proceeds to step S106. In step S106, the camera MPU 101 performs bounce flash photography. If the camera MPU 101 has not received the notification (NO in step S404), the process returns to step S104.

As described above, the camera MPU 101 switches the process performed in the case where the SW2 is turned on after the SW1 has been turned on and before the auto bounce operation has been started, based on the set shooting mode.

The camera 100 thus becomes capable of performing photographing according to the user intention.

According to the present exemplary embodiment, the camera 100 switches control performed in the case where the user instruction to start the photographing operation is received after transmitting the auto bounce operation execution instruction to the external flash 120 and before receiving the auto bounce operation end notification from the external flash 120. As a result, the camera 100 is prevented from unsuccessfully photographing an image, for example, it prevents only a portion of the object from being irradiated with the flashed light. Further, the camera 100 becomes capable of performing photographing according to the user intention.

According to the above-described exemplary embodiments, when the optimum irradiation direction is to be determined, the information obtained by the light metering unit 208 and the orientation detection unit 203 in the external flash 120 are used. However, the information obtained by the camera 100 may also be used. For example, when the external flash 120 is attached to the camera 100, the orientation of the camera 100 and the orientation of the external flash 120 are in a predetermined correspondence relation. In such a case, the information on the orientation of the camera 100 may be used instead of the information on the orientation of the external flash 120. Further, the distance between the light emitting unit 207 and the object can be calculated based on the lens information of the lens unit 300. The distance between the light emitting unit 207 and the object can thus be calculated based on the information on the lens unit 300.

Furthermore, the distance between the light emitting unit 207 and the object and the distance between the light emitting unit 207 and the ceiling can be calculated by a method in which infrared light illumination unit and an infrared light receiving unit are arranged in the irradiation direction of the light emitting unit 207, and the object and the ceiling are irradiated with the infrared light to calculate the distance.

Moreover, the optimum irradiation direction for performing bounce flash photography may be determined by a method in which pre-flash is performed by finely changing the irradiation direction in addition to the front direction and the ceiling direction to determine, as the optimum irradiation direction, the irradiation direction in which the pre-flash light metering value becomes the optimum result to perform bounce flash photography. Further, pre-flash is performed by finely changing the irradiation direction, and the irradiation direction in which a luminance distribution of the image, exposed by the image sensor 102 when pre-flash is performed, has become the optimum result may then be determined as the optimum irradiation direction.

Furthermore, according to the above-described exemplary embodiments, the irradiation direction is determined by driving the movable unit 122 in the ceiling direction when performing the auto bounce operation. However, the irradiation direction may also be determined by driving the movable unit 122 in a direction perpendicular to the ceiling direction.

Moreover, the camera MPU 101 may perform at least a portion of the calculations performed by the external flash 120 when determining the optimum irradiation direction for performing bounce flash photography.

Further, according to the above-described exemplary embodiments, the execution of the auto bounce operation is triggered by the instruction to start the photographing preparation (i.e., the SW1 being turned on). However, the user operation on the auto bounce start switch for causing the auto bounce operation to be executed may be the trigger for executing the auto bounce operation.

Furthermore, according to the above-described exemplary embodiments, the movable unit in the illumination apparatus is rotatable in the vertical and horizontal directions with respect to the main body unit. However, the movable unit in the illumination apparatus may only be rotatable in one of the vertical direction and the horizontal direction with respect to the main body unit.

Moreover, according to the above-described exemplary embodiments, the external flash 120 is used in performing the auto bounce operation. However, the present invention is applicable to the case where the built-in flash 119 is used in performing the auto bounce operation.

The preferred exemplary embodiments of the present invention have been described above. However, the present invention is not limited to the exemplary embodiments, and various modifications and changes can be implemented within the scope of the invention.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127003 filed Jun. 17, 2013, which is hereby incorporated by reference herein in its entirety.

What is claimed is:

1. An imaging apparatus to perform a photographing operation using an illumination apparatus having a moveable unit, that includes a light emitting unit having a light source, and having a motor capable of automatically driving the moveable unit to change an irradiation direction of the light emitting unit, the imaging apparatus comprising:
    a first interface configured to communicate with the illumination apparatus;
    a second interface configured to receive an instruction to start a photographing operation; and
    a microcontroller configured to perform control, wherein, in a case where the second interface receives the instruction to start a photographing operation after the first interface transmits an instruction, to the illumination apparatus, to determine an irradiation direction of the light emitting unit but before the first interface receives a notification indicating that determining the irradiation direction of the light emitting unit has ended, the microcontroller performs control to prevent performing a photographing operation during which the light emitting unit causes the light source to emit light, even if the light emitting unit is at a position where the light emitting unit is able to emit light, and wherein, in the case where the second interface receives the instruction to start the photographing operation after an instruction to start an operation for determining an irradiation direction of the light emitting unit has been transmitted to the illumination apparatus and before a notification to end driving of the moveable unit has been received from the illumination apparatus, the microcontroller performs control to prevent performing flash photography.

2. A camera system to perform a photographing operation, the camera system comprising:

an illumination apparatus having a moveable unit, that includes a light emitting unit having a light source, and having a motor capable of automatically driving the moveable unit to change an irradiation direction of the light emitting unit; and an imaging apparatus having a first interface configured to communicate with the illumination apparatus, a second interface configured to receive an instruction to start a photographing operation, and a microcontroller configured to perform control, wherein, in a case where the second interface receives the instruction to start a photographing operation after the first interface transmits an instruction, to the illumination apparatus, to determine an irradiation direction of the light emitting unit but before the first interface receives a notification indicating that determining the irradiation direction of the light emitting unit has ended, the microcontroller performs control to prevent performing a photographing operation during which the light emitting unit causes the light source to emit light, even if the light emitting unit is at a position where the light emitting unit is able to emit light, and wherein, in the case where the second interface receives the instruction to start the photographing operation after an instruction to start an operation for determining an irradiation direction of the light emitting unit has been transmitted to the illumination apparatus and before a notification to end driving of the moveable unit has been received from the illumination apparatus, the microcontroller performs control to prevent performing flash photography.

3. A control method for an imaging apparatus to perform a photographing operation using an illumination apparatus having a moveable unit, that includes a light emitting unit having a light source, and having a motor capable of automatically driving the moveable unit to change an irradiation direction of the light emitting unit, wherein the imaging apparatus includes a first interface, a second interface, and a microcontroller, the control method comprising:

communicating, via the first interface, with the illumination apparatus;

receiving, via the second interface, an instruction to start a photographing operation; and performing control, wherein, in a case where the second interface receives the instruction to start a photographing operation after the first interface transmits an instruction, to the illumination apparatus, to determine an irradiation direction of the light emitting unit but before the first interface receives a notification indicating that determining the irradiation direction of the light emitting unit has ended, performing control includes performing control via the microcontroller to prevent performing a photographing operation during which the light emitting unit causes the light source to emit light, even if the light emitting unit is at a position where the light emitting unit is able to emit light, and wherein, in the case where the second interface receives the instruction to start the photographing operation after an instruction to start an operation for determining an irradiation direction of the light emitting unit has been transmitted to the illumination apparatus and before a notification to end driving of the moveable unit has been received from the illumination apparatus, the microcontroller performs control to prevent performing flash photography.

* * * * *